United States Patent
Nakahara

(10) Patent No.: US 8,872,837 B2
(45) Date of Patent: Oct. 28, 2014

(54) DEVICE AND METHOD FOR PROVIDING APPLICATION ARRANGEMENT DISPLAY RULE, AND APPLICATION EXECUTION TERMINAL DEVICE, AND DISPLAY METHOD THEREFOR

(75) Inventor: Fumitaka Nakahara, Tokyo (JP)

(73) Assignee: NEC Corporation, Tokyo (JP)

( * ) Notice: Subject to any disclaimer, the term of this patent is extended or adjusted under 35 U.S.C. 154(b) by 572 days.

(21) Appl. No.: 13/203,842

(22) PCT Filed: Mar. 26, 2010

(86) PCT No.: PCT/JP2010/002173
§ 371 (c)(1),
(2), (4) Date: Aug. 30, 2011

(87) PCT Pub. No.: WO2010/116652
PCT Pub. Date: Oct. 14, 2010

(65) Prior Publication Data
US 2011/0310129 A1    Dec. 22, 2011

(30) Foreign Application Priority Data

Mar. 30, 2009    (JP) .................................. 2009-083565

(51) Int. Cl.
*G09G 5/36*    (2006.01)
*G06T 1/60*    (2006.01)
*G06F 3/0481*    (2013.01)
*G06F 9/44*    (2006.01)

(52) U.S. Cl.
CPC ............ *G06F 9/4443* (2013.01); *G06F 3/0481* (2013.01)

USPC .......................................... 345/556; 345/530

(58) Field of Classification Search
None
See application file for complete search history.

(56) References Cited

U.S. PATENT DOCUMENTS

2004/0098462 A1    5/2004    Horvitz et al.

FOREIGN PATENT DOCUMENTS

| JP | 2003-304184 A | 10/2003 |
| JP | 2007-536600 A | 12/2007 |
| WO | 2008/050512 A1 | 5/2008 |

*Primary Examiner* — Jacinta M Crawford
(74) *Attorney, Agent, or Firm* — Sughrue Mion, PLLC

(57) ABSTRACT

To make it possible to display an application that is suitable for specific circumstances of a specific user, from among a large number of applications, without complicating a rule file and without increasing its capacity. An application execution terminal acquires context information from received sensor information, acquires an arrangement display rule file that matches the acquired context information from among arrangement display rule files in which a category indicating a type of an application and a display position of the application are defined, analyzes a category defined by the acquired arrangement display rule file, acquires a list of applications that match the category, links the applications indicated by the list of the applications to the acquired arrangement display rule file, and arranges and displays the applications in accordance with a description of the arrangement display rule file.

19 Claims, 13 Drawing Sheets

FIG. 1

```
<!-- CONTEXT IS '25 DEGREES OR MORE IN TOKYO' -->
<?xml version="1.0" encoding="utf-8"?>
<context>
    <location>Tokyo Office</location>
    <temperature>over25</temperature>                   ~10
</context>
<widgets>
<!-- WIDGET 1-->
    <widget value="Widget_1">
<!-- CATEGORY IS MAILER-->
        <category>mail</category>
        <init>
        <position>
            <x>100</x>
            <y>150</y>
        </position>
        <enlarge> 80 </enlarge>                          }11
        <rotate>0</rotate>
        <transparency>0</transparency>
        </init>
    </widget>
<!-- WIDGET 2-->
    <widget value="Widget_2">
<!-- CATEGORY IS SCHEDULER-->
        <category>schedule</category>
<!-- INITIAL VALUE-->
     ┌  <init>
     │  <position>
     │      <x>120</x>
     │      <y>300</y>
  13a┤  </position>
     │  <enlarge> 100 </enlarge>
     │  <rotate>0</rotate>
     └  <transparency>10</transparency>                  }12
        </init>
<!-- NETWORK OPERATION-->
     ┌  <wifi="on">
     │  <position>
     │      <x>240</x>
     │      <y>450</y>
  13b┤  </position>
     │  <enlarge> 80 </enlarge>
     │  <rotate>15</rotate>
     └  <transparency>20</transparency>
        </wifi>
    </widget>
</widgets>
```

| CATEGORY | APPLICATION |
|---|---|
| MAILER | MAILER WIDGET N |
| SCHEDULER | SCHEDULER WIDGET E |
| ROUTE RETRIEVAL | ROUTE RETRIEVAL WIDGET C |
|  |  |

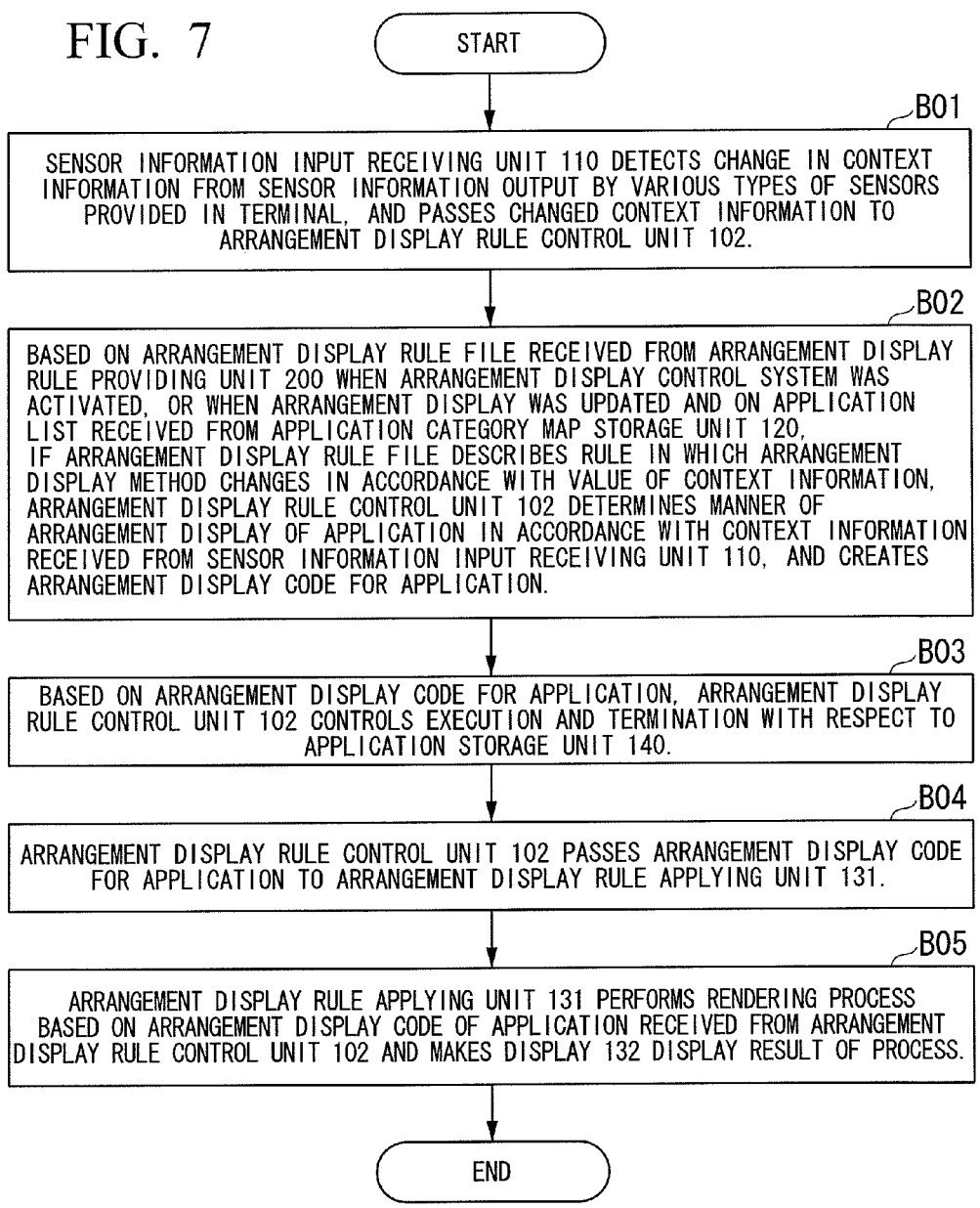

FIG. 9A

| CATEGORY | APPLICATION |
|---|---|
| MAILER | MAILER WIDGET N1 |
| MAILER | MAILER WIDGET N2 |
| SCHEDULER | SCHEDULER WIDGET E1 |
| SCHEDULER | SCHEDULER WIDGET E2 |
| ROUTE RETRIEVAL | ROUTE RETRIEVAL WIDGET C1 |
| ROUTE RETRIEVAL | ROUTE RETRIEVAL WIDGET C2 |
| ROUTE RETRIEVAL | ROUTE RETRIEVAL WIDGET C3 |
| | |

FIG. 9B

| CATEGORY | APPLICATION | SCORE |
|---|---|---|
| MAILER | MAILER WIDGET N1 | 98 |
| MAILER | MAILER WIDGET N2 | 65 |
| SCHEDULER | SCHEDULER WIDGET E1 | 77 |
| SCHEDULER | SCHEDULER WIDGET E2 | 59 |
| ROUTE RETRIEVAL | ROUTE RETRIEVAL WIDGET C1 | 83 |
| ROUTE RETRIEVAL | ROUTE RETRIEVAL WIDGET C2 | 71 |
| ROUTE RETRIEVAL | ROUTE RETRIEVAL WIDGET C3 | 67 |
| | | |

US 8,872,837 B2

DEVICE AND METHOD FOR PROVIDING APPLICATION ARRANGEMENT DISPLAY RULE, AND APPLICATION EXECUTION TERMINAL DEVICE, AND DISPLAY METHOD THEREFOR

CROSS REFERENCE TO RELATED APPLICATIONS

This application is a National Stage of International Application No. PCT/JP2010/002173, filed on Mar. 26, 2010, which claims priority from Japanese Patent Application No. 2009-083565, filed on Mar. 30, 2009, the contents of all of which are incorporated herein by reference in their entirety.

TECHNICAL FIELD

The present invention relates to a device and method for providing application arrangement display rule for controlling the arrangement and display of usable applications on a screen on a terminal, an application execution terminal device, and a display method therefor.

BACKGROUND ART

Recently, with improvements in the performance of portable terminals such as mobile telephones, a great many small-scale applications that start up simultaneously, known as widgets and gadgets, are emerging. Also, with improvements in line speed and greater reliability of networks that link mobile telephones to the internet, there is a proliferation of usage of temporarily downloading and using required applications rather than installing all of them, a proliferation of services that operate as applications on the server side, such as web applications and software as a service (SaaS), and a proliferation of application download-type thin clients, and the like. As a consequence, there has recently been a sharp increase in the number of usable applications on the user terminal.

However, when the number of applications increases, there is a problem that it becomes difficult for the user to ascertain the applications that can be used on the terminal. In particular, push-type applications and web applications are updated daily, and new applications sometimes become usable before the user has learned about them. Therefore, one conceivable solution is to determine applications that match the user's preferences and profiles based on context, and select and display suitable applications. Also, to handle a greatly increased number of applications, for example, Patent Document 1 discloses a technique of creating a herald to perform summarized notification of application updates and the like.

PRIOR ART DOCUMENT

Patent Document

Patent Document 1: Published Japanese Translation No. 2007-536600 of the PCT International Publication

DISCLOSURE OF THE INVENTION

Problems to be Solved by the Invention

As described above, recently, due to an increase in the number of applications on local terminals that has followed the enlargement of data storage regions of the terminals, and due to an increase in the number of push-type applications or web applications that has followed higher network speeds, it is becoming difficult for users to retrieve for and appropriately display applications required in specific circumstances.

Also, there are schemes of controlling the arrangement and display of applications by using display rules for controlling the activation and arrangement of the applications in accordance with context information acquired from information sensors. However, if arrangement display rules are created under precise conditions depending on the users' profiles and contexts, there is a problem that the capacity of the arrangement display rule file becomes enormous.

Patent Document 1 discloses a method of making rules defining the display position and the display method of the herald in order to handle an increase in the number of applications. However, it is difficult for Patent Document 1 to appropriately display the usable applications depending on the context.

The present invention has been made in view of the above problems, and an exemplary object thereof is to provide a device and method for providing application arrangement display rule, an application execution terminal device, and a display method therefor, that can optimally arrange and display, from among a large number of applications, an application that is suitable for specific circumstances of a specific user, without complicating an arrangement display rule file and without enlarging its capacity.

Means for Solving the Problem

To solve the abovementioned problems, the present invention is an application arrangement display rule providing device that includes an arrangement display rule table that stores an arrangement display rule file which defines a category indicating a type of an application and a display position of the application, for every piece of information indicating a context, and a unit that, upon receipt of the information indicating the context from an application execution terminal that arranges and displays the application in accordance with a description of the arrangement display rule file, acquires an arrangement display rule file stored in correspondence with the information indicating the context from the arrangement display rule table, and transmits the acquired arrangement display rule file to the application execution terminal.

The present invention is an application execution terminal device that includes an application category map storage unit that stores a map which associates a category indicating a type of an application with the application, a sensor information input reception unit that receives sensor information and acquires context information indicating a context, an arrangement display rule control unit that acquires an arrangement display rule file that matches context information sent from the sensor information input reception unit, among arrangement display rule files in which the category and a display position of the application are defined, analyzes a category defined by the acquired arrangement display rule file, and acquires a list of applications that match the category from the application category map storage unit, and a display unit that links the applications indicated by the list of the applications to the arrangement display rule file, and arranges and displays the applications in accordance with a description of the arrangement display rule file.

The present invention is an arrangement display rule providing method that includes receiving information indicating a context from an application execution terminal, acquiring an arrangement display rule file stored in correspondence with the received information indicating the context, among arrangement display rule files in which a category indicating a type of an application and a display position of the application are defined, and transmitting the acquired arrangement display rule file to the application execution terminal.

The present invention is a display method of an application execution terminal that includes receiving sensor information and acquiring context information indicating a context, retrieving and acquiring an arrangement display rule file that matches the context information, among arrangement display rule files in which a category indicating a type of an application and a display position of the application are defined, analyzing a category defined by the acquired arrangement display rule file, and acquiring a list of applications that match the category, and linking the applications indicated by the list of the applications to the acquired arrangement display rule file, and arranging and displaying the applications in accordance with a description of the arrangement display rule file.

Effects of the Invention

In accordance with the present invention, applications can be arranged and displayed so as to conform to a layout depending on a context such as the circumstances of a user (e.g. that the user is shopping in a mall or working in an office), without ascertaining individual applications. Additionally, in accordance with the present invention, an application list can be linked to category information in an arrangement display rule file without describing specific applications in the arrangement display rule file. Therefore, the arrangement display rule file and the application list can be updated independently. This prevents the arrangement display rule file from becoming complicated even if there are a great many usable applications, and can easily handle updates of applications. Moreover, the transparency setting, enlargement, reduction, and complex processes in conjunction with changes in context, can be described in the arrangement display rule file. Furthermore, since an arrangement display rule file depending on context, such as the user's circumstances, is acquired and provided to the terminal, the capacity of the arrangement display rule file can be reduced. The present invention is particularly more effective when applied to a use case in which a terminal with a display that does not have high resolution, such as a mobile telephone, is used and applications become usable before the user of the terminal can ascertain this fact, such as in a push-type application system.

BRIEF DESCRIPTION OF THE DRAWINGS

FIG. 1 is an explanatory diagram of a description of an arrangement display rule file in a first exemplary embodiment of the present invention.

FIG. 7 is a flowchart used for explanation of the operation of the first exemplary embodiment of the present invention.

FIG. 9A is an explanatory diagram of an application list in the second exemplary embodiment of the present invention.

FIG. 9B is an explanatory diagram of an application list in the second exemplary embodiment of the present invention.

MODE FOR CARRYING OUT THE INVENTION

Figures 2, 3A:
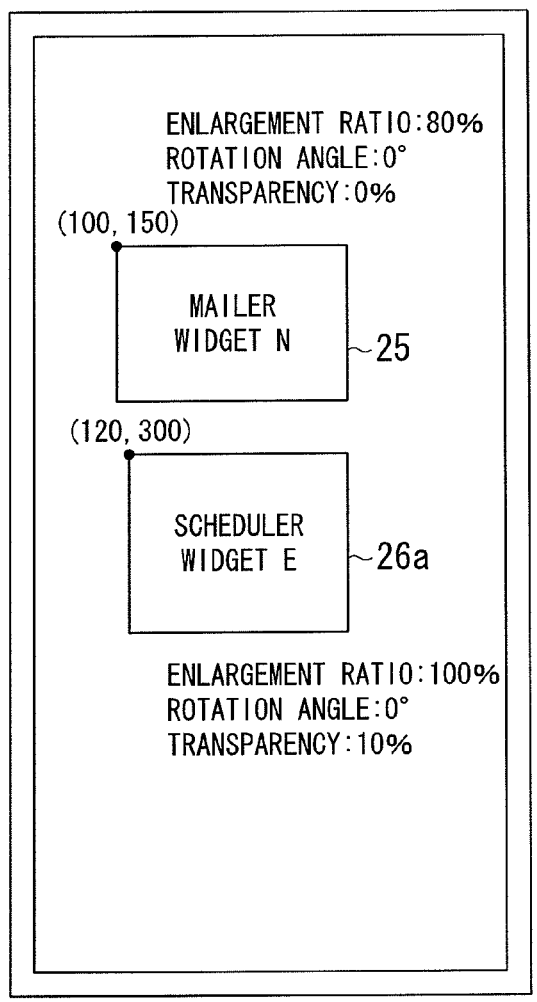
FIG. 2 is an explanatory diagram of an application list in the first exemplary embodiment of the present invention.
FIG. 3A is an explanatory diagram of an application display in accordance with a description of an arrangement display rule file in the first exemplary embodiment of the present invention.

Hereinafter, exemplary embodiments of the present invention will be described with reference to the drawings.

First Exemplary Embodiment

FIG. 1 is an example of an arrangement display rule file used in a first exemplary embodiment of the present invention. This arrangement display rule file describes arrangement rules of applications written in meta information.

In FIG. 1, a describing section 10 shows context information indicating context. Here, the section enclosed within the <context> tag and the </context> tag shows the context information. Context information describes the circumstances of a user, such as the time, the location, and the identity of a person with the user. More specifically, the context information indicates that the user is shopping in a mall or at work in an office or such like. The context information can be acquired from information of various types of sensors. Specifically, sensors can include a positional information detection device such as a global positioning system (GPS), a clock, a device that detects a wireless signal from an access point, a near-field wireless communication detection device, a device that detects card usage, a thermometer, a humidity gauge, a clinical thermometer, and a blood pressure gauge. All or part of the information from these sensors can be used. For example, if a GPS is used, information indicating the user's location can be acquired. If a clock is used, information indicating the time can be acquired. If a thermometer is used, the temperature around the user can be acquired. If a near-field wireless communication detection device is used, information indicating who the user is with can be acquired by acquiring equipment information of other users. In FIG. 1, the describing section 10 includes location information (the section enclosed within the <location> tag and the </location> tag) and temperature information (the section enclosed within the <temperature> tag and the </temperature> tag). The describing section 10 shows context information of "location="Tokyo office" and temperature="over 25"", which indicates that "the location is Tokyo and the temperature is 25 degrees or more".

Describing sections 11 and 12 show arrangement information of applications. Here, the section enclosed within the <widgets> tag and the </widgets> tag shows display information of all the widget applications. Display information of two applications, namely a widget Widget_1 and a widget Widget_2, are described in the describing sections 11 and 12, respectively.

The describing unit 11 includes category information indicating the category of the application (the section enclosed within the <category> tag and the </category> tag), initial value information (the section enclosed within the <init> tag and the </init> tag), arrangement positional information (the section, denoted with x and y coordinates, enclosed within the <position> tag and the </position> tag), enlargement information (the section enclosed within the <enlarge> tag and the </enlarge> tag), rotation information (the section enclosed within the <rotate> tag and the </rotate> tag), and a transparency information (the section enclosed within the <transparency> tag and the </transparency> tag). The description of the describing section 11 shows that the application "Widget_1" having a category of mailer is, in an initial state, arranged at the XY coordinates of (100, 150), and is displayed with an enlargement ratio of 80 percent, a rotation angle of 0 degrees, and a transparency of 0 percent.

The describing section 12 shows the arrangement information of the application Widget_2. The describing section 12 includes category information (the section enclosed within the <category> tag and the </category> tag), and describing sections 13a and 13b. The describing section 13a shows description information in the initial state, and the describing section 13b shows description information when the wireless communication is switched on.

The describing section 13a includes initial value information (the section enclosed within the <init> tag and the </init> tag), arrangement positional information (the section, denoted with x and y coordinates, enclosed within the <position> tag and the </position> tag), enlargement information (the section enclosed within the <enlarge> tag and the </enlarge> tag), rotation information (the section enclosed within the <rotate> tag and the </rotate> tag), and a transparency information (the section enclosed within the <transparency> tag and the </transparency> tag). The describing section 13a shows that the application "Widget_2" having a category of scheduler is, in an initial state, arranged at the XY coordinates of (120, 300), and displayed with an enlargement ratio of 100 percent, a rotation angle of 0 degrees, and a transparency of 10 percent.

The describing section 13b includes wireless communication ON information (the section enclosed within the <wifi="on"> tag and the </wifi> tag), arrangement positional information (the section, denoted with x and y coordinates, enclosed within the <position> tag and the </position> tag), enlargement information (the section enclosed within the <enlarge> tag and the </enlarge> tag), rotation information (the section enclosed within the <rotate> tag and the </rotate> tag), and a transparency information (the section enclosed within the <transparency> tag and the </transparency> tag). The describing section 13b shows that the application "Widget_2" having a category of schedule is, in a state where wireless communication is ON, arranged at the XY coordinates of (240, 450), and displayed with an enlargement ratio of 80 percent, a rotation angle of 15 degrees, and a transparency of 20 percent.

Thus, the arrangement display rule file in the first exemplary embodiment of the present invention can describe the specification of coordinates, rotation, enlargement, reduction, movement, and switching between display/non-display with respect to display of an application in meta information. Moreover, the arrangement display rule file can describe a rule in which a method for arranging and displaying the application changes in accordance with the value of context information. For example, the arrangement display rule file can describe the specification of coordinates, rotation, enlargement, reduction, transparency change, movement, and display/non-display switching of an application in conjunction with changes in time, position, temperature, etc. Also, the relative coordinate specification, relative rotation, relative enlargement, relative reduction, relative transparency change, relative movement, and relative switching between display/non-display of an application can be described in conjunction with changes in time, position, temperature, etc.

A feature of the above-described arrangement display rule file is that there is no need to describe a specific application. A specific application is set by linking the application list to the category information (the section enclosed within the <category> tag and the </category> tag).

For example, let us suppose that, in the application list shown in FIG. 2, "mailer widget N" is described as a "mailer" application, "scheduler widget E" is described as a scheduler application, and "route retrieval widget C" is described as a route retrieval application. In this case, "mailer widget N" from the application list in FIG. 2 is linked as the application Widget_1 in the describing section 11, and "scheduler widget E" from the application list in FIG. 2 is linked as the application Widget_2 in the describing section 12.

As shown in FIG. 3A, in the initial state, in accordance with the describing section 11 of the arrangement display rule file of FIG. 1, an application 25 of "mailer widget N" is thus displayed at the XY coordinates of (100, 150), with an enlargement ratio of 80 percent, a rotation angle of 0 degrees, and a transparency of 0 percent. Also, in accordance with the describing section 13a of the arrangement display rule file, an application 26a of "scheduler widget E" is displayed at the XY coordinates of (120, 300), with an enlargement ratio of 100 percent, a rotation angle of 0 degrees, and a transparency of 10 percent.

Figure 3B:
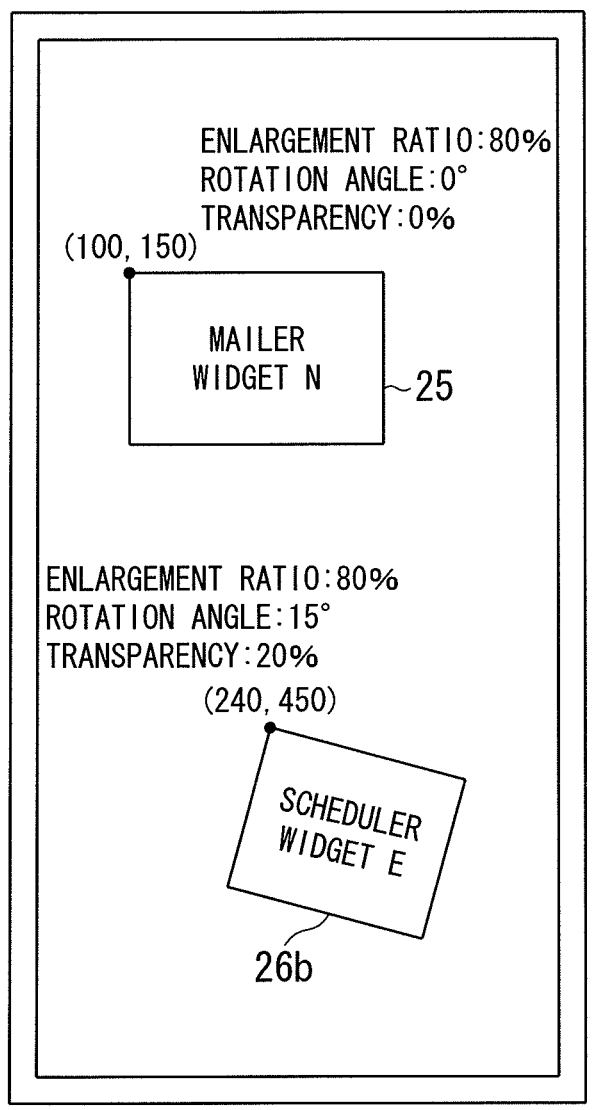
FIG. 3B is an explanatory diagram of an application display in accordance with a description of an arrangement display rule file in the first exemplary embodiment of the present invention.

When wireless communication is turned ON, as shown in FIG. 3B, in accordance with the description of the describing section 11 of the arrangement display rule file, the application 25 of "mailer widget N" is displayed at the XY coordinates of (100, 150), with an enlargement ratio of 80 percent, a rotation angle of 0 degrees, and a transparency of 0 percent. Also, in accordance with the description of the describing section 13b of the arrangement display rule file, an application 26b of "scheduler widget E" is displayed at the XY coordinates of (240, 450), with an enlargement ratio of 80 percent, a rotation angle of 15 degrees, and a transparency of 20 percent.

Thus, in the arrangement display rule file described above, it is not necessary to describe the arrangement display rule for each application. Therefore, even if the number of applications increases, the description of the arrangement display rule file does not increase. Also, the application list can be updated independently of the arrangement display rule file. Moreover, the arrangement display rule file can be prepared separately for each user or for each of circumstances of the user. This can reduce the capacity of the arrangement display rule file, while making it easier to update the arrangement display rule file. Furthermore, a provider skilled in arrangement display layout can configure the layout, even if he does not know which application can be used by that user, provided that he knows only the category and the display priority of the application.

The first exemplary embodiment of the present invention displays usable applications on the terminal by retrieving, from among such arrangement display rule files in meta information, an arrangement display rule file that matches context information acquired from information output from a sensor (hereinafter referred to as "sensor information"), extracting a list of applications that match the category of the retrieved arrangement display rule file, and carries out rendering in accordance with the description of the arrangement display rule file.

Figure 4:
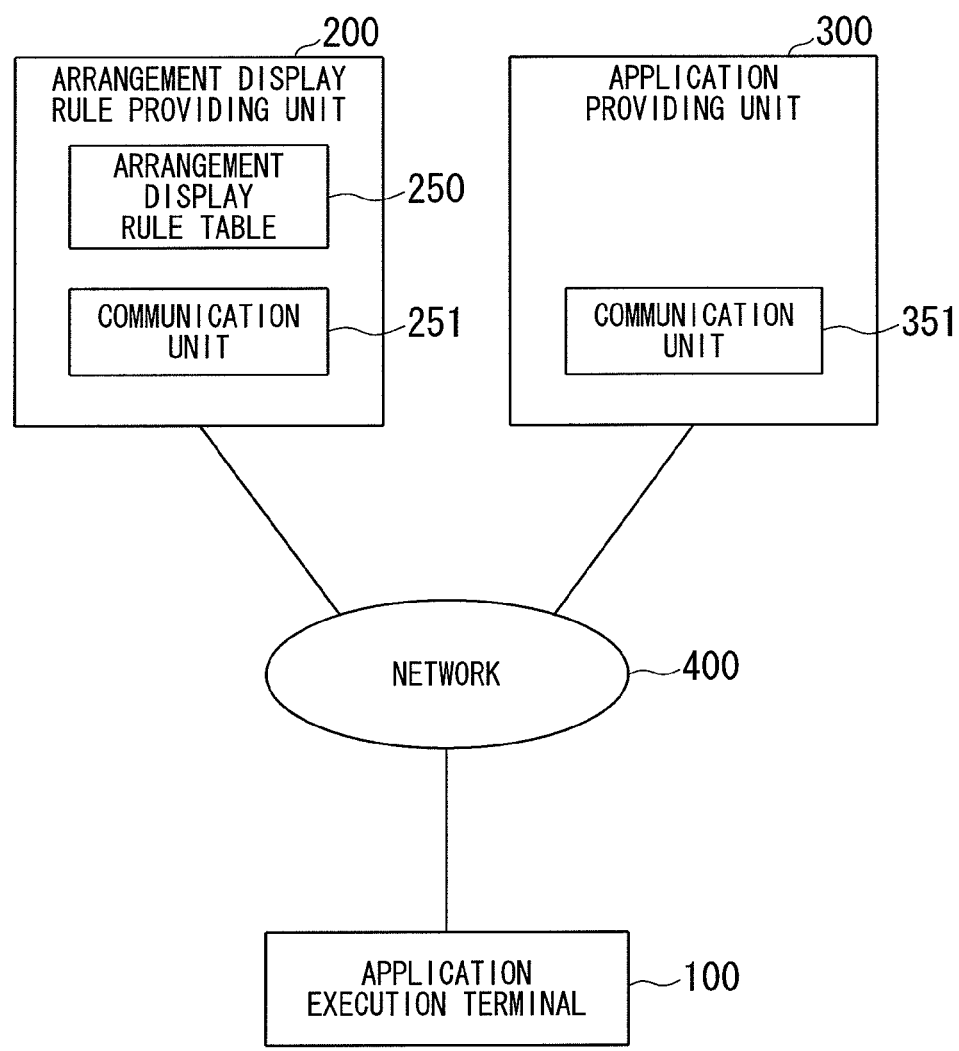
FIG. 4 is a block diagram used for explanation of an outline of a system in accordance with the first exemplary embodiment of the present invention.

FIG. 4 shows an outline of a system in accordance with the first exemplary embodiment of the present invention. In FIG. 4, an application execution terminal 100 is a terminal carried by a user. A plurality of applications can be executed at this application execution terminal 100. Also, a positional information detection device such as a GPS, a clock, a device that detects a wireless signal from an access point, a near-field wireless communication detection device, a device that detects card usage, and the like, are installed in the application execution terminal 100 as sensors. Context information can be created using sensor information output from these sensors. The application execution terminal 100, an arrangement display rule providing unit 200, and an application providing unit 300 can be connected via a network 400.

The arrangement display rule providing unit 200 provides an arrangement display rule file to the application execution terminal 100. As mentioned above, this arrangement display rule file is described in meta information, and includes category information. By linking an application that matches this category information to the category information, the application can be displayed in accordance with the arrangement display rule file. As shown in FIG. 4, the arrangement display rule providing unit 200 includes an arrangement display rule table 250. An arrangement display rule file for each context is stored in this arrangement display rule table 250. The arrangement display rule providing unit 200 is configured as a server on the network 400, and includes a communication unit 251 for executing network communications.

The application providing unit 300 provides application programs to the application execution terminal 100. The applications herein include applications stored in the application execution terminal 100, applications that are push-distributed to the application execution terminal 100, and applications provided using both these methods (i.e., applications that are push-distributed to the application execution terminal 100 and stored in the application execution terminal 100). These applications also include applications executed in the application execution terminal 100, and applications executed outside the application execution terminal 100 (e.g., those executed by the application providing unit 300). The application providing unit 300 is configured as a server on the network 400, and includes a communication unit 351 for executing network communications.

The application execution terminal 100 creates context information based on the sensor information mentioned above. When the context changes, the application execution terminal 100 transmits the context information to the arrangement display rule file providing unit 200. When the arrangement display rule file providing unit 200 receives the context information from the application execution terminal 100, it acquires an arrangement display rule file being stored in correspondence with that context information from the arrangement display rule table 250, and transmits it to the application execution terminal 100. The application execution terminal 100 links category information of the acquired arrangement display rule file to an application corresponding to the category indicated by that category information, and displays the application in accordance with the description of the arrangement display rule file.

Figure 5:
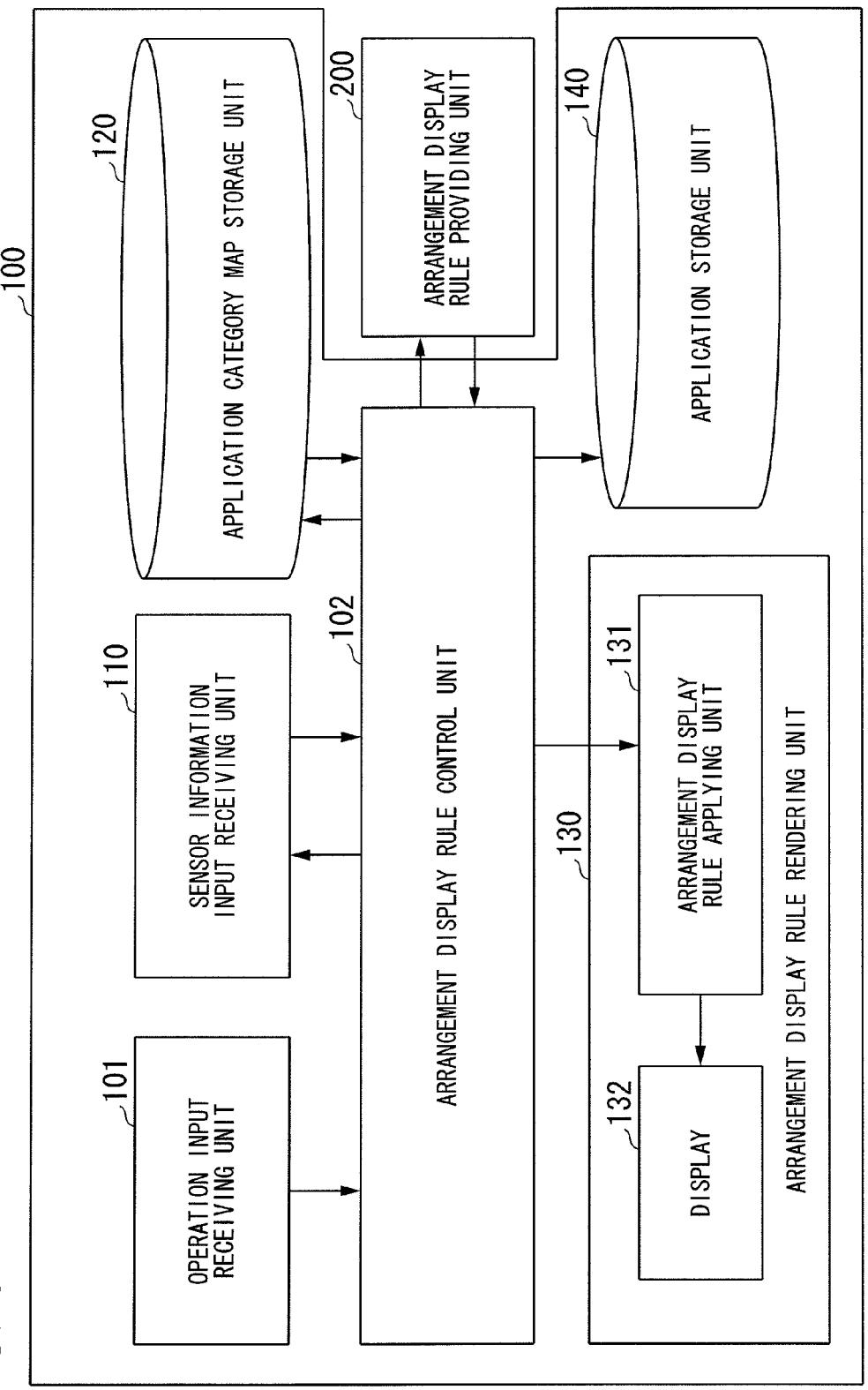
FIG. 5 is a block diagram of the configuration of an application execution terminal together with an arrangement display rule providing unit in the first exemplary embodiment of the present invention.

FIG. 5 shows the details of the application execution terminal 100, together with the arrangement display rule providing unit 200, in the first exemplary embodiment of the present invention.

Referring to FIG. 5, the application execution terminal 100 in the first exemplary embodiment of the present invention includes an operation input receiving unit 101, an arrangement display rule control unit 102, a sensor information input receiving unit 110, an application category map storage unit 120, an arrangement display rule rendering unit 130, and an application storage unit 140. The arrangement display rule rendering unit 130 includes an arrangement display rule applying unit 131 and a display 132.

The operation input receiving unit 101 includes an interface used when a user switches the arrangement and display of an application, and has a function of sending an arrangement display control activation command to the arrangement display rule control unit 102. Specifically, it provides a button-like interface for receiving an operation input on the display of the terminal, and if the user presses this button, it sends an arrangement display control activation command of the application arrangement display control system to the arrangement display rule control unit 102. Alternatively, if the user has pressed the button during the application arrangement display control system is activated, the operation input receiving unit 101 sends the arrangement display control update command to the arrangement display rule control unit 102. Interfaces provided by the operation input receiving unit 101 can have any kind of interface, provided that it satisfies such functions.

The arrangement display rule control unit 102 is a control device for determining the arrangement of an application in accordance with an arrangement display rule. Specifically, when the arrangement display rule control unit 102 has received an arrangement display control activation command or an arrangement display control update command from the operation input receiving unit 101, it makes a present context information acquisition request to the sensor information input receiving unit 110 to acquire the context information. Moreover, the arrangement display rule control unit 102 passes the context information acquired from the sensor information input receiving unit 110 to the arrangement display rule providing unit 200, and thereby acquires an arrangement display rule file corresponding to the context information from the arrangement display rule providing unit 200. As shown in FIG. 1, this arrangement display rule file describes an arrangement rule of the application in meta information.

Also, the arrangement display rule control unit 102 analyzes the arrangement display rule file acquired from the arrangement display rule providing unit 200, extracts the category specified in the rule, inquires for the extracted category to the application category map storage unit 120, and acquires an application list that matches the condition from the application category map storage unit 120. The category information can be extracted from the section enclosed within the <category> tag and the </category> tag of the arrangement display rule file.

Moreover, based on the arrangement display rule file received from the arrangement display rule providing unit 200 and the application list received from the application category map storage unit 120, the arrangement display rule control unit 102 connects the arrangement display rule file with the application list, and passes them to the arrangement display rule applying unit 131. Additionally, when the arrangement display rule file describes a rule in which the arrangement display method changes in accordance with the value of the context information, the arrangement display rule control unit 102 determines the manner of the arrangement and the display of the application in accordance with the context information received from the sensor information input receiving unit 110, creates an arrangement display code, and passes it to the arrangement display rule applying unit 131. Depending on the application displayed with a created arrangement display code, the arrangement display rule control unit 102 also controls the execution and termination of the application with respect to the application storage unit 140.

Additionally, when the arrangement display rule control unit 102 has received an updated value of context information from the sensor information input receiving unit 110, it re-determines the manner of the arrangement and the display of the application in accordance with the value of the context information, re-creates the arrangement display code, and passes it to the arrangement display rule applying unit 131.

The sensor information input receiving unit 110 has a function of collecting sensor information output from various types of sensors provided in the terminal, creating context information, and collecting a log. Specifically, when there is a context information acquisition request from the arrangement display rule control unit 102, or when there is a change in the context information acquired from the sensor information, the sensor information input receiving unit 110 passes the context information, which is created based on the sensor information output from the various types of sensors, to the arrangement display rule control unit 102. This context information is used in determining which arrangement display rule file the arrangement display rule providing unit 200 will distribute and in determining of which widget the arrangement display rule control unit 102 will determine the manner of display from the condition described in the arrangement display rule file, based on information acquired from a positional information detection device such as a GPS.

The sensor information input receiving unit 110 can also set a threshold for determining that the context information has changed. For example, when using a GPS, a threshold can be set regarding whether or not the application execution terminal 100 is further to the east than 139 degrees of east longitude, and, when the context information exceeds the threshold, the sensor information input receiving unit 110 deems that the context information has changed. This is to prevent the sensor information input receiving unit 110 from passing the context information to the arrangement display rule control unit 102 after a very slight shift of location when using context information which has continuous numerical values acquired from a positional information detection device such as a GPS.

The sensors used can conceivably include a positional information detection device such as a GPS, a clock, a device that detects a wireless signal from an access point, a device that detects the usage of an electronic money card, a thermometer, a humidity gauge, a clinical thermometer, a blood pressure gauge, etc. However, any type of sensor is acceptable which enables a condition determination to be made based on sensor information acquired from that sensor.

With respect to a category of an application specified in an arrangement display rule, the application category map storage unit 120 stores a map that connects the application corresponding to the category at the terminal. Specifically, as shown in FIG. 2, it stores an application map stating that "mailer widget N" is used as an application having the category of "mailer", that "scheduler widget E" is used as a widget having the category of "scheduler", and that "route retrieval widget C" is used as a category of "route retrieval".

The arrangement display rule rendering unit 130 performs a rendering process that reflects the arrangement display rule, and outputs to the display 132. Specifically, based on the arrangement display rule of the connected application acquired from the arrangement display rule control unit 102, the arrangement display rule applying unit 131 performs a rendering process that implements the manner described in the arrangement display rule file, and outputs it to a screen on the display 132. Also, based on an updated arrangement display rule of the connected application acquired from the arrangement display rule control unit 102, the arrangement display rule applying unit 131 performs a rendering process that implements the manner described in the arrangement display rule file, and outputs it to the screen on the display 132.

The application storage unit 140 stores programs of usable applications, and executes or terminates the applications in accordance with a control command to execute or terminate from the arrangement display rule control unit 102.

As described above, the arrangement display rule providing unit 200 provides an arrangement display rule file depending on the context information. Specifically, the arrangement display rule providing unit 200 has a function of receiving the context information from the arrangement display rule control unit 102, and passing an arrangement display rule file depending on the received context information to the arrangement display rule control unit 102.

Figure 6A:
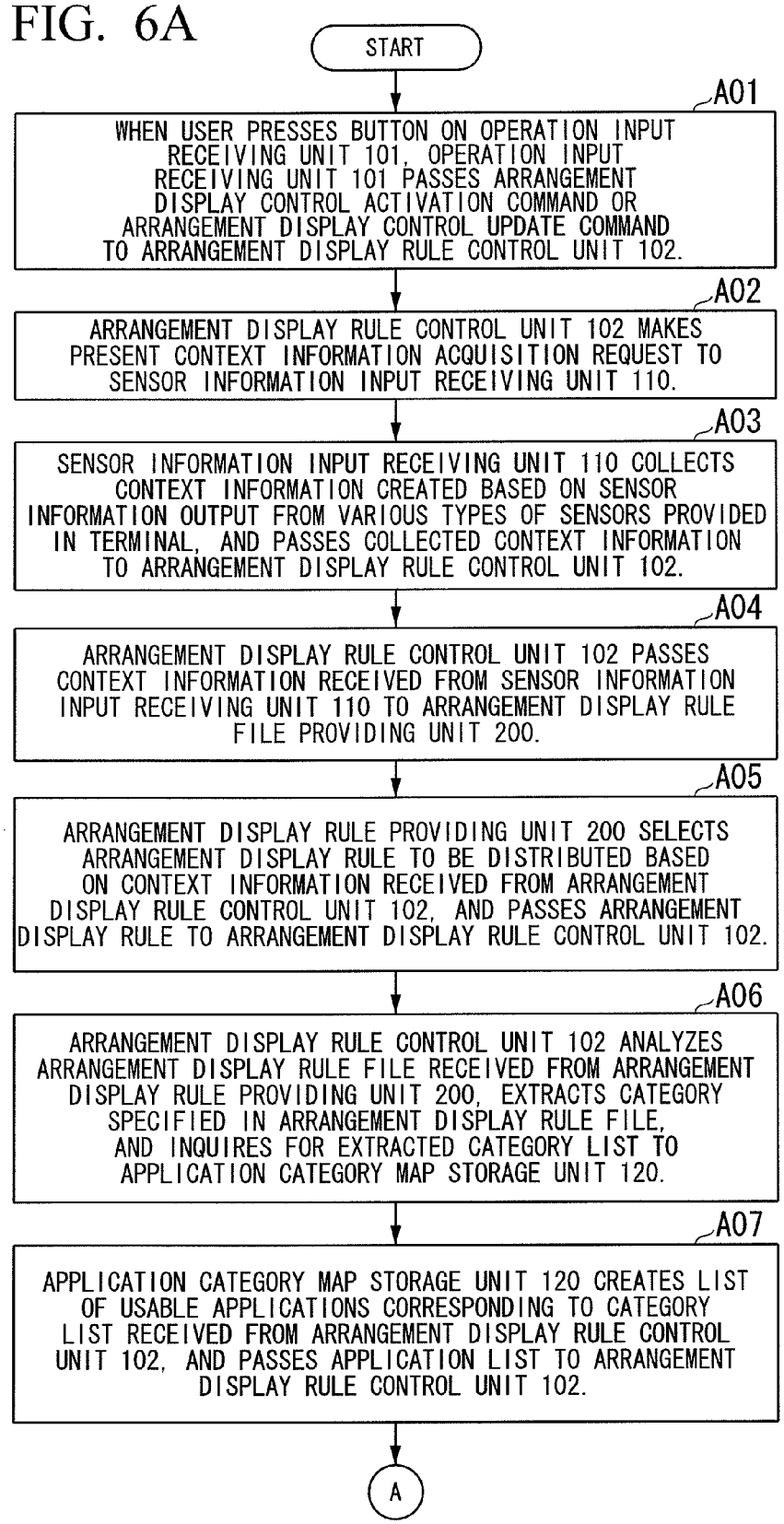
FIG. 6A is a flowchart used for explanation of the operation of the first exemplary embodiment of the present invention.
Figure 6B:
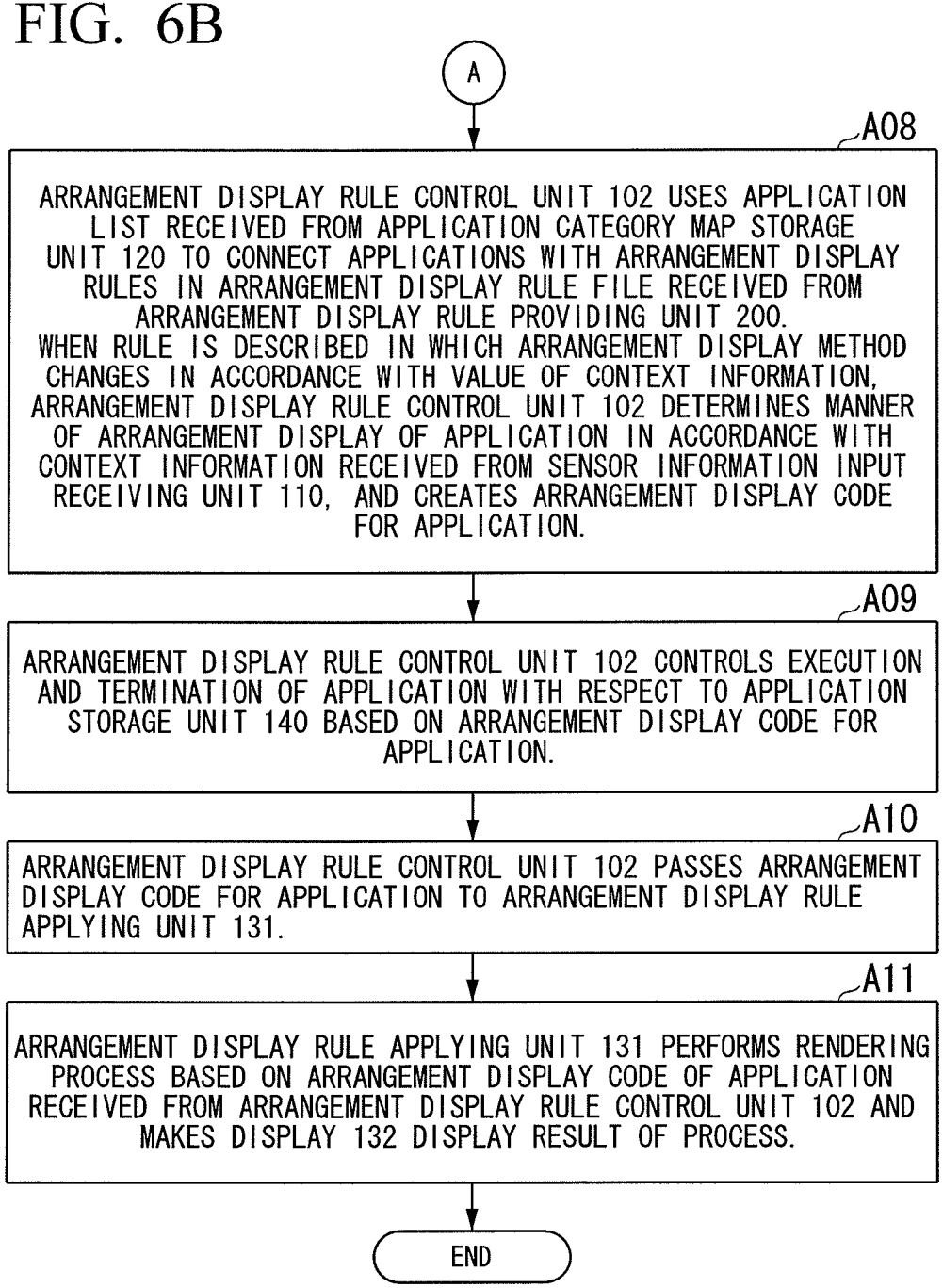
FIG. 6B is a flowchart used for explanation of the operation of the first exemplary embodiment of the present invention.

Subsequently, the operation of the first exemplary embodiment of the present invention will be described with reference to FIGS. 6A and 6B.

Firstly, when the user presses the button on the operation input receiving unit 101, the operation input receiving unit 101 passes an arrangement display control activation command or an arrangement display control update command, to the arrangement display rule control unit 102 (Step A01). Thus, the arrangement display rule control unit 102 makes a present context information acquisition request to the sensor information input receiving unit 110 (Step A02). The sensor information input receiving unit 110 then collects context information created based on sensor information output from the various types of sensors provided in the terminal, and passes the collected context information to the arrangement display rule control unit 102 (Step A03). The arrangement display rule control unit 102 then passes the context information received from the sensor information input receiving unit 110 to the arrangement display rule providing unit 200 (Step A04).

When the arrangement display rule providing unit 200 receives the context information from the arrangement display rule control unit 102, it retrieves an arrangement display rule file that matches the context information. That is, as shown in FIG. 1, the context information is described in the section enclosed within the <context> tag and the </context> tag. The arrangement display rule providing unit 200 compares the context information created at the sensor information input receiving unit 110 based on sensor information output from the various types of sensors provided in the terminal with the context information described in the describing section 10 of the arrangement display rule file, and retrieves the one that matches the most. For example, if the context information is "25 degrees or more in Tokyo", the arrangement display rule file described as shown in FIG. 1 is retrieved. When the arrangement display rule providing unit 200 retrieves the arrangement display rule file that matches the context information, it passes the arrangement display rule file to the arrangement display rule control unit 102 (Step A05).

The arrangement display rule control unit 102 then analyzes the arrangement display rule file received from the arrangement display rule providing unit 200, and extracts the category specified in the arrangement display rule file. That is, as shown in FIG. 1, the category information is described in the section enclosed within the <category> tag and the </category> tag. The category list is extracted from the description of this category information, and an inquiry is made for the extracted category list to the application category map storage unit 120 (Step A06).

Subsequently, the application category map storage unit 120 creates a list of usable applications corresponding to the category list received from the arrangement display rule control unit 102, and passes this application list to the arrangement display rule control unit 102 (Step A07). As shown in FIG. 2, the application list describes the usable applications for each category.

The arrangement display rule control unit 102 then uses the application list received from the application category map storage unit 120 to connect the applications with the arrangement display rules in the arrangement display rule file received from the arrangement display rule providing unit 200. Additionally, when a rule is described in which the arrangement and display method changes in accordance with the value of the context information, the arrangement display rule control unit 102 determines the manner of the arrangement and the display of the application in accordance with the context information received from the sensor information input receiving unit 110, and creates an arrangement display code for the application (Step A08).

The arrangement display rule control unit 102 then controls the execution and termination of the application with respect to the application storage unit 140 based on the arrangement display code (Step A09). The arrangement display rule control unit 102 then passes the arrangement display code to the arrangement display rule applying unit 131 (Step A10).

The arrangement display rule applying unit 131 performs a rendering process based on the arrangement display code received from the arrangement display rule control unit 102, and makes the display 132 display the result of the process (Step A11). Thus, if the context information acquired at the sensor information input receiving unit 110 is, for example, "25 degrees or more in Tokyo", the arrangement display rule file described as shown in FIG. 1 is acquired, and this arrangement display rule file is connected with the application list shown in FIG. 2, and the applications are arranged and displayed as shown in FIG. 3A or FIG. 3B.

FIG. 7 shows a procedure of switching the arrangement and display of an application when the context changes. When the sensor information input receiving unit 110 detects a change in the context information from the sensor information output by the various types of sensors provided in the terminal, it passes the changed context information to the arrangement display rule control unit 102 (Step B01).

Subsequently, based on the arrangement display rule file received from the arrangement display rule providing unit 200 when the arrangement display control system was activated, or when the arrangement and display were updated, as well as on the application list received from the application category map storage unit 120, if the arrangement display rule file describes a rule in which the arrangement and display method changes in accordance with the value of the context information, the arrangement display rule control unit 102 determines the manner of the arrangement and the display of the application in accordance with the context information received from the sensor information input receiving unit 110, and creates an arrangement display code for the application (Step B02).

The arrangement display rule control unit 102 then controls the execution and termination of the application with respect to the application storage unit 140 based on the created arrangement display code (Step B03). The arrangement display rule control unit 102 then passes the created arrangement display code to the arrangement display rule applying unit 131 (Step B04). The arrangement display rule applying unit 131 performs a rendering process based on the arrangement display code received from the arrangement display rule control unit 102, and makes the display 132 display the result of the process (Step B05).

This enables specification of coordinates, rotation, enlargement, reduction, transparency change, movement, and switching between display/non-display of the application to be performed in conjunction with, for example, changes in time, position, temperature, etc. Also, the relative coordinate specification, relative rotation, relative enlargement, relative reduction, relative transparency change, relative movement, and relative switching between display/non-display of the application can be performed in conjunction with changes in time, position, temperature, etc.

It is to be noted that in the exemplary embodiment described above, when the arrangement display rule control unit 102 has made a present context information acquisition request to the sensor information input receiving unit 110, context information that can be acquired from the sensor information input receiving unit 110 is a collection of sensor information acquired from the sensors. However, a context conversion function that converts context information acquired from sensor information into context information in another format can be added to the sensor information input receiving unit 110. This makes it possible to provide the arrangement display rule control unit 102 with, for example, a value of address data that has been converted from the value of latitude and longitude information acquired from a GPS. This enables the context to be handled more intuitively when describing a condition specification of context information in an arrangement display rule. Similarly, by using the context conversion function, when an access point of a wireless local area network (LAN) installed within a building can be detected in an underground shopping area of the building where a GPS cannot be used, it becomes possible to use the context of the detection of the access point of the wireless LAN, which is not normally a sensor that expresses a location, as a condition for specifying a context of "I am in basement of building".

Second Exemplary Embodiment

Figure 8:
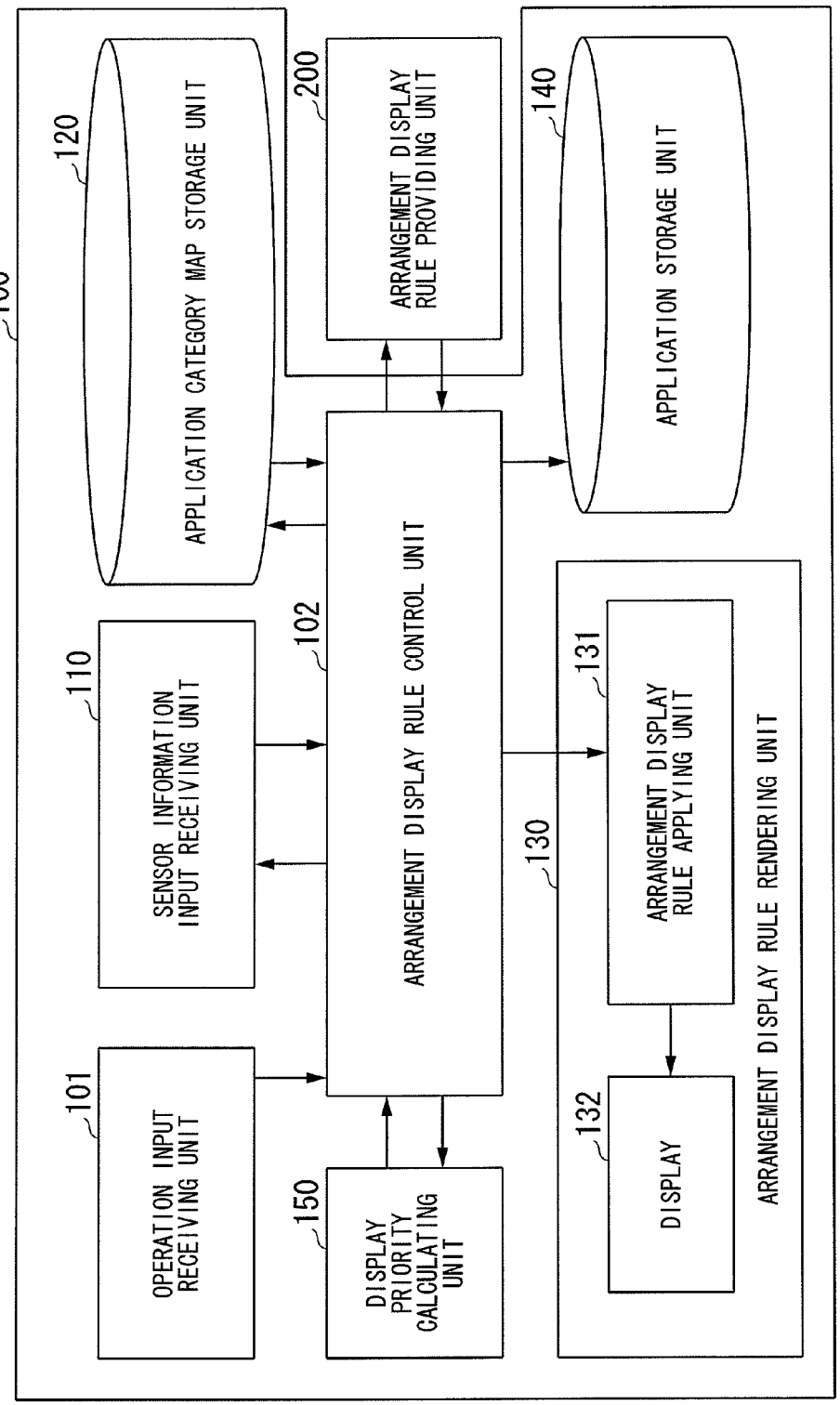
FIG. 8 is a block diagram of the configuration of an application execution terminal together with an arrangement display rule providing unit in a second exemplary embodiment of the present invention.

FIG. 8 shows the details of the application execution terminal 100, together with the arrangement display rule providing unit 200, in a second exemplary embodiment of the present invention. In the first exemplary embodiment, the categories stored in the application category map storage unit 120 are mapped to the applications on a one-to-one basis. In contrast, this exemplary embodiment can handle a case where there is a plurality of applications for the same category.

That is, as shown in FIG. 2, in the first exemplary embodiment, the categories and the applications correspond on a one-to-one basis; i.e., one application "mailer widget N" corresponds to the category of mailer, one application "scheduler widget E" corresponds to the category of scheduler, and one application "route retrieval widget C" corresponds to the category of route retrieval.

In contrast, in this exemplary embodiment, as shown in FIG. 9A, "mailer widget N1" and "mailer widget N2" correspond to the category of mailer, "scheduler widget E1" and "scheduler widget E2" correspond to the category of scheduler, and "route retrieval widget C1", "route retrieval widget C2", and "route retrieval widget C3" correspond to the category of route retrieval.

As can be understood from a comparison of FIG. 5 and FIG. 8, in the second exemplary embodiment of the present invention, a display priority calculating unit 150 is further provided, as compared to the first exemplary embodiment described above. The display priority calculating unit 150 calculates display priorities for multiple registered applications, and thereby determines the applications that should be displayed. It is to be noted that in FIG. 8, units that correspond to those of FIG. 5 in accordance with the first exemplary embodiment described above are designated with like reference symbols and the description thereof is omitted.

As in the above-described first exemplary embodiment, the arrangement display rule control unit 102 receives the context information acquired from the sensor information input receiving unit 110, and acquires an arrangement display rule file that matches the context information from the arrangement display rule providing unit 200. The arrangement display rule control unit 102 then extracts the category from the arrangement display rule file, inquires for the extracted category to the application category map storage unit 120, and acquires a list of applications that match the condition from the application category map storage unit 120. At this point, in the above-described first exemplary embodiment, the categories are mapped to the applications on a one-to-one basis; whereas in this exemplary embodiment, as shown in FIG. 9A, a category can correspond to a plurality of applications. When a category corresponds to a plurality of applications, the arrangement display rule control unit 102 acquires a list of all the applications from the application category map storage unit 120.

When the arrangement display rule control unit 102 acquires the application list from the application category map storage unit 120, it passes this application list to the display priority calculating unit 150. The display priority calculating unit 150 calculates the scores required to determine the priority orders of the applications that should be displayed among the plurality of applications in accordance with the context information acquired from the sensor information input receiving unit 110. One conceivable specific method of calculating the scores is to accumulate the usage histories of the applications in a log, and use the number of usages as the scores. Another conceivable calculating method is collaborative filtering that incorporates a usage history generally used in rating technology and usage circumstances and profiles of a user himself or herself and other people. However, it is acceptable to use any method that can determine a calculation result for determining priority orders for each category of the applications.

As shown in FIG. 9B, the arrangement display rule control unit 102 transmits an application list to which the display priority scores have been added and the arrangement display rule file, to the arrangement display rule applying unit 131. The arrangement display rule applying unit 131 acquires the application list to which the display priority scores have been added and the arrangement display rule file, and determines the application that should be arranged and displayed and also performs a rendering process. At this time, if there is a plurality of applications for the same category, the application that should be displayed is determined based on the display priority scores. Lastly, the result of the rendering process performed by the arrangement display rule applying unit 131 is displayed on a screen on the display 132.

The second exemplary embodiment of the present invention can handle a case where there is a plurality of applications for the same category. Also, in the second exemplary embodiment of the present invention, when there is a plurality of applications for the same category, the display priority scores are calculated, and are used to make it possible to simultaneously display two or more applications for the same category in accordance with the priority orders. Moreover, when there are two or more applications for the same category, it is also possible to display only those with high priority among the applications.

Figure 10A:
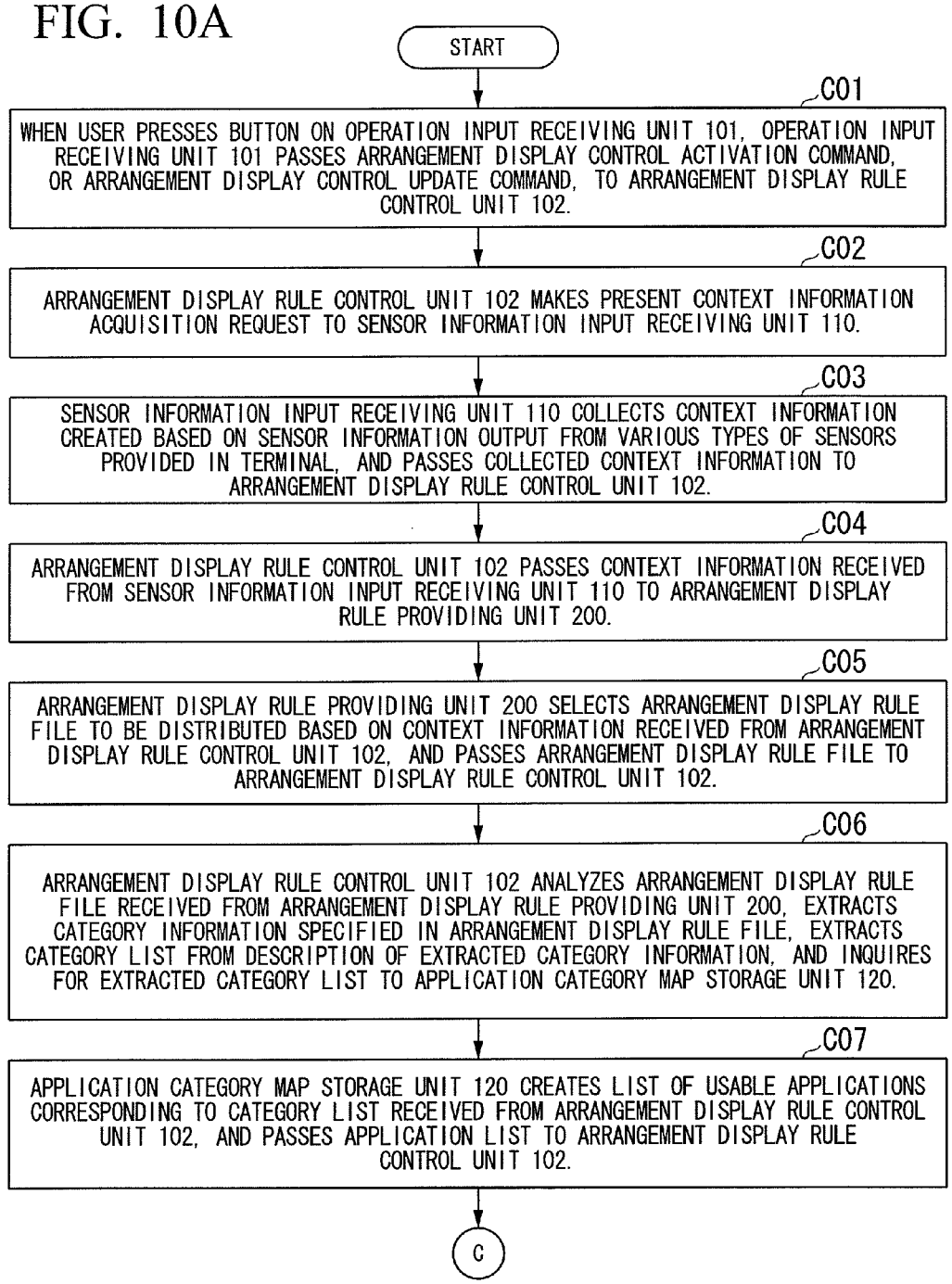
FIG. 10A is a flowchart used for explanation of the operation of the second exemplary embodiment of the present invention.
Figure 10B:
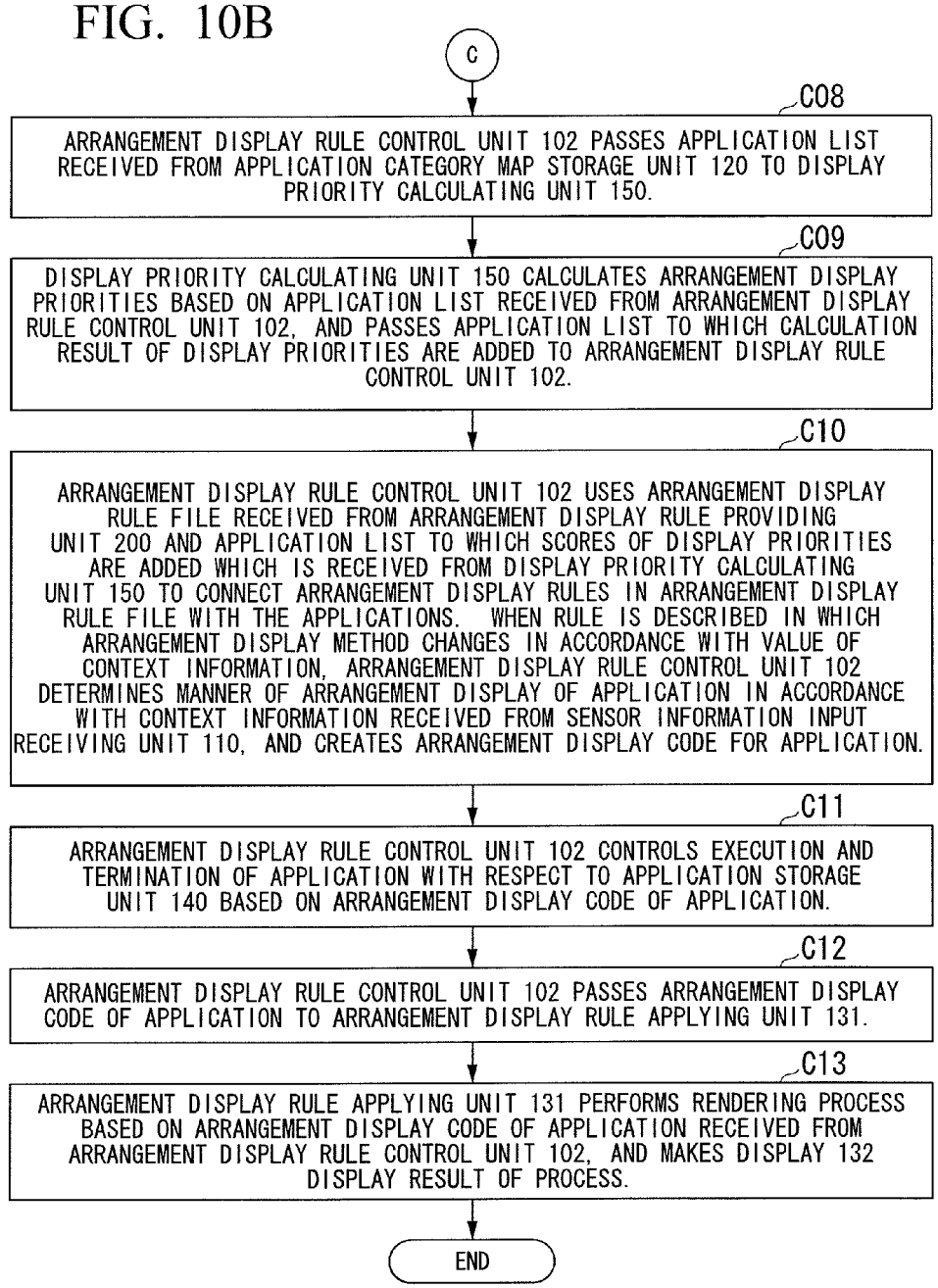
FIG. 10B is a flowchart used for explanation of the operation of the second exemplary embodiment of the present invention.

Subsequently, the details of the operation of the second exemplary embodiment of the present invention will be described. FIG. 10A and FIG. 10B are flowcharts illustrating an operation of the second exemplary embodiment of the present invention.

Firstly, when the user presses the button on the operation input receiving unit 101, the operation input receiving unit 101 passes an arrangement display control activation command or an arrangement display control update command, to the arrangement display rule control unit 102 (Step C01). Thus, the arrangement display rule control unit 102 makes a present context information acquisition request to the sensor information input receiving unit 110 (Step C02). The sensor information input receiving unit 110 then collects context information created based on sensor information output from the various types of sensors provided in the terminal, and passes the collected context information to the arrangement display rule control unit 102 (Step C03).

Subsequently, the arrangement display rule control unit 102 passes the context information received from the sensor information input receiving unit 110 to the arrangement display rule providing unit 200 (Step C04). The arrangement display rule providing unit 200 retrieves the arrangement display rule file that matches the context information received from the arrangement display rule control unit 102, and passes the retrieved arrangement display rule file to the arrangement display rule control unit 102 (Step C05).

The arrangement display rule control unit 102 then analyzes the arrangement display rule file received from the arrangement display rule providing unit 200, extracts a category list specified in the arrangement display rule file, and inquires for the extracted category list to the application category map storage unit 120 (Step C06). The application category map storage unit 120 creates a list of usable applications corresponding to the category list received from the arrangement display rule control unit 102, and passes this application list to the arrangement display rule control unit 102 (Step C07). There can be a plurality of applications for one category.

Subsequently, the arrangement display rule control unit 102 passes the application list received from the application category map storage unit 120 to the display priority calculating unit 150 (Step C08). The display priority calculating unit 150 calculates arrangement display priorities based on the application list received from the arrangement display rule control unit 102. The display priority calculating unit 150 then passes the application list to which the calculated result of the scores of the display priorities are added to the arrangement display rule control unit 102 (Step C09).

The arrangement display rule control unit 102 uses the arrangement display rule file received from the arrangement display rule providing unit 200 and the application list to which the scores of the display priorities are added received from the display priority calculating unit 150 to connect the arrangement display rules in the arrangement display rule file with the applications. When there is a plurality of applications for the same category, the arrangement display rule control unit 102 determines the application that should be displayed based on the display priority scores. Additionally, when a rule is described in which the arrangement and display method changes in accordance with the value of the context information, the arrangement display rule control unit 102 determines the manner of the arrangement and the display of the application in accordance with the context information received from the sensor information input receiving unit 110, and creates an arrangement display code for the application (Step C10).

The arrangement display rule control unit 102 then controls the execution and termination of the application with respect to the application storage unit 140 based on the arrangement display code (Step C11). The arrangement display rule control unit 102 then passes the arrangement display code to the arrangement display rule applying unit 131 (Step C12). Subsequently, the arrangement display rule applying unit 131 performs a rendering process based on the arrangement display code received from the arrangement display rule control unit 102, and makes the display 132 display the result of the process (Step C13).

Third Exemplary Embodiment

Figure 11:
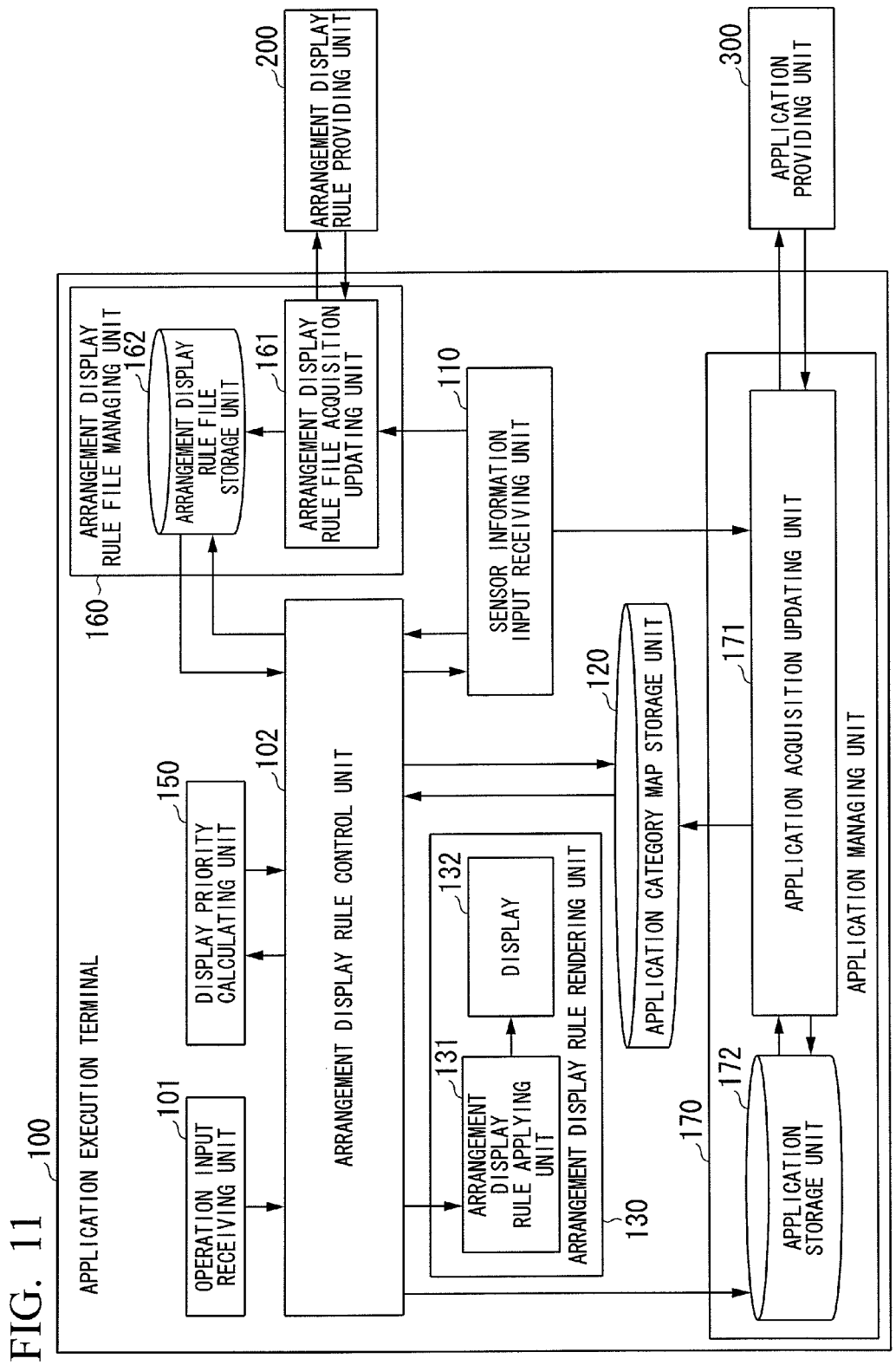
FIG. 11 is a block diagram of the configuration of an application execution terminal together with an arrangement display rule providing unit and an application providing unit in a third exemplary embodiment of the present invention.

FIG. 11 shows the details of the application execution terminal 100, together with the arrangement display rule providing unit 200 and an application providing unit 300, in a third exemplary embodiment of the present invention. In acquiring the arrangement display rules and the applications, this exemplary embodiment uses the context information acquired from the sensor information input receiving unit 110 to estimate and pre-fetch arrangement display rules and applications that will conceivably be used in the near future. Exemplary advantages of this exemplary embodiment are that it can shorten the processing time by reducing the number of processes until the rendering process, and that it enables pre-fetched arrangement display rules and applications to be used even in a temporary offline state. Also, since the arrangement display rules can be provided and updated depending on the context acquired from information sensors, the capacity of the arrangement display rule file can be reduced and the maintenance of the arrangement display rules can be facilitated.

In this exemplary embodiment, an arrangement display rule file managing unit 160 includes an arrangement display rule file acquisition updating unit 161 and an arrangement display rule file storage unit 162. The arrangement display rule providing unit 200 has a function of providing, when a request for an arrangement display rule is received from the arrangement display rule file acquisition updating unit 161, an arrangement display rule corresponding to a key, context information acquired at the time of the request being used as this key, to the application execution terminal 100 (the arrangement display rule file acquisition updating unit 161).

An application managing unit 170 includes an application acquisition updating unit 171 and an application storage unit 172. The application providing unit 300 has a function of providing, when there is a request for an application acquisition update from the application acquisition updating unit 171, an application corresponding to a key, context information acquired at the time of the request being used as this key, to the application execution terminal 100 (the application acquisition updating unit 171).

In this exemplary embodiment, an arrangement display rule file is acquired and updated in the following manner. In FIG. 11, when there is a change in the context in accordance with data obtained sequentially from sensors mounted on various types of terminals, the sensor information input receiving unit 110 transmits the latest context information to the arrangement display rule file acquisition updating unit 161.

The arrangement display rule file acquisition updating unit 161 then estimates an arrangement display rule file that matches the context information and a subsequent context change from the context information acquired from the sensor information input receiving unit 110, and acquires an arrangement display rule file that matches higher-order context information of the estimated context (i.e., information relating to a context that has a higher possibility of changing from the present context than other contexts) from the arrangement display rule providing unit 200.

Lastly, the arrangement display rule file acquisition updating unit 161 stores the arrangement display rule file acquired from the arrangement display rule providing unit 200 in the arrangement display rule file storage unit 162.

Moreover, in this exemplary embodiment, an application is acquired and updated in the following manner. In FIG. 11, when there is a change in the context in accordance with data obtained sequentially from sensors mounted on various types of terminals, the sensor information input receiving unit 110 transmits the latest context information to the application acquisition updating unit 171.

Subsequently, the application acquisition updating unit 171 estimates an application that matches the context information and a subsequent context change from the context information acquired from the sensor information input receiving unit 110, and acquires an application that matches higher-order context information of the estimated context from the application providing unit 300.

The application acquisition updating unit 171 then stores the application acquired from the application providing unit 300 in the application storage unit 172, and adds mapping data for connecting the application with a category to the application category map storage unit 120.

While the present invention has been particularly shown and described with reference to exemplary embodiments thereof, the present invention is not limited to those exemplary embodiments. It will be understood by those of ordinary skill in the art that various changes in form and details may be made therein without departing from the spirit and scope of the present invention as defined in the claims.

It is to be noted that the application execution terminal 100, the arrangement display rule providing unit 200, and the application providing unit 300 described above can each include a computer. For example, steps of the processes described above can be stored in a computer-readable recording medium in the form of a program, and the processes are performed by making a computer read and execute the program. Here, a computer-readable recording medium denotes a magnetic disc, a magneto-optical disc, a compact disc read-only memory (CD-ROM), a digital versatile disc (DVD)-ROM, a semiconductor memory, etc. Furthermore, the program can be distributed to a computer via a communication line, and executed by the computer that received the distribution. It is also acceptable that the program realizes some of the functions described above. Moreover, the program can be a so-called differential file (differential program) that can realize the functions described above in combination with a program already stored in the computer system.

This application is based upon and claims the benefit of priority from Japanese Patent Application No. 2009-083565, filed on Mar. 30, 2009, the disclosure of which is incorporated herein in its entirety by reference.

INDUSTRIAL APPLICABILITY

The present invention can be used in displaying a plurality of system applications, such as applications stored locally at the terminal, applications and widgets that have been push-distributed from the internet, and applications executed on a web such as web applications and SaaS, on a user terminal.

DESCRIPTION OF REFERENCE SYMBOLS 100 application execution terminal
101 operation input receiving unit
102 arrangement display rule control unit (arrangement display rule control unit, display unit)
110 sensor information input receiving unit (sensor information input reception unit, context conversion unit)
120 application category map storage unit (application category map storage unit)
130 arrangement display rule rendering unit (display unit)
131 arrangement display rule applying unit (display unit)
132 display (display unit)
140 application storage unit
150 display priority calculating unit (display priority calculating unit)
160 arrangement display rule file managing unit
161 arrangement display rule file acquisition updating unit (arrangement display rule file acquisition updating unit)
162 arrangement display rule file storage unit
170 application managing unit
171 application acquisition updating unit (application acquisition updating means unit)
172 application storage unit
200 arrangement display rule providing unit
300 application providing unit

The invention claimed is:

1. An application arrangement display rule providing device comprising:
   an arrangement display rule table that stores an arrangement display rule file which defines a category indicating a type of an application and a display position of the application, for every piece of information indicating a context; and
   a unit that, upon receipt of the information indicating the context from an application execution terminal that arranges and displays the application in accordance with a description of the arrangement display rule file, acquires an arrangement display rule file stored in correspondence with the information indicating the context from the arrangement display rule table, and transmits the acquired arrangement display rule file to the application execution terminal.

2. The application arrangement display rule providing device according to claim 1, wherein the arrangement display rule file is described in meta information.

3. The application arrangement display rule providing device according to claim 1, wherein the arrangement display rule file includes information that changes an arrangement and display of the application in accordance with the value of the information indicating the context.

4. The application arrangement display rule providing device according to claim 3, wherein the information that changes the arrangement and display of the application is information that changes all or some of a specification of a coordinate, a rotation angle, an enlargement ratio, a reduction ratio, transparency, a movement amount, and switching between display/non-display of the application in conjunction with a change in the context.

5. The application arrangement display rule providing device according to claim 1, wherein the arrangement display rule table stores the arrangement display rule file separately for each user or for each of circumstances of a user.

6. A non-transitory computer-readable recording medium having stored thereon a computer program that when executed by a computer realizes the application arrangement display rule providing device according to claim 1.

7. An application execution terminal device comprising:
   an application category map storage unit that stores a map which associates a category indicating a type of an application with the application;
   a sensor information input reception unit that receives sensor information and acquires context information indicating a context;
   an arrangement display rule control unit that acquires an arrangement display rule file that matches context information sent from the sensor information input reception unit, among arrangement display rule files in which the category and a display position of the application are defined, analyzes a category defined by the acquired arrangement display rule file, and acquires a list of applications that match the category from the application category map storage unit; and
   a display unit that links the applications indicated by the list of the applications to the arrangement display rule file, and arranges and displays the applications in accordance with a description of the arrangement display rule file.

8. The application execution terminal device according to claim 7, wherein the sensor information input reception unit receives information acquired from all or part of a positional information detection device, a clock, a device that detects a wireless signal from an access point, a near-field wireless communication detection device, a device that detects card usage, a thermometer, a humidity gauge, a clinical thermometer, and a blood pressure gauge, as the sensor information.

9. The application execution terminal device according to claim 7, wherein the sensor information input reception unit further comprising a context conversion unit that converts the context information acquired by receiving the sensor information into context information in another format.

10. The application execution terminal device according to claim 7, further comprising a display priority calculating unit that calculates display priorities of the applications included in the list of the applications acquired from the application category map storage unit.

11. The application execution terminal device according to claim 10, wherein the display priority calculating unit calculates the display priorities based on an application usage history.

12. The application execution terminal device according to claim 10, wherein the display priority calculating unit calculates the display priorities based on a profile and usage circumstances of a user.

13. The application execution terminal device according to claim 7, further comprising an arrangement display rule file acquisition update unit that estimates a future arrangement display rule based on the context information acquired from the sensor information input reception unit, and pre-fetches the estimated arrangement display rule file.

14. The application execution terminal device according to claim 7, further comprising an application acquisition update unit that estimates a future application based on the context information acquired from the sensor information input reception unit, and pre-fetches the estimated application.

15. The application execution terminal device according to claim 7, wherein the arrangement display rule control unit acquires the arrangement display rule file when the context information has changed.

16. The application execution terminal device according to claim 15, wherein the sensor information input reception unit sets a threshold for determining change of the context information, and determines that the context information has changed when the context information has exceeded the threshold.

17. A non-transitory computer readable recording medium having stored thereon a computer program that when executed by a computer realizes the application execution terminal device according to claim 7.

18. An application arrangement display rule providing method comprising:
   receiving information indicating a context from an application execution terminal;
   acquiring an arrangement display rule file stored in correspondence with the received information indicating the context, among arrangement display rule files in which a category indicating a type of an application and a display position of the application are defined; and
   transmitting the acquired arrangement display rule file to the application execution terminal.

19. A display method of an application execution terminal comprising:
   receiving sensor information and acquiring context information indicating a context;
   retrieving and acquiring an arrangement display rule file that matches the context information, among arrangement display rule files in which a category indicating a type of an application and a display position of the application are defined;
   analyzing a category defined by the acquired arrangement display rule file, and acquiring a list of applications that match the category; and
   linking the applications indicated by the list of the applications to the acquired arrangement display rule file, and arranging and displaying the applications in accordance with a description of the arrangement display rule file.

* * * * *